US009875701B2

(12) United States Patent
Mok et al.

(10) Patent No.: US 9,875,701 B2
(45) Date of Patent: Jan. 23, 2018

(54) LIQUID CRYSTAL DISPLAY

(71) Applicant: SAMSUNG DISPLAY CO., LTD., Yongin-si, Gyeonggi-Do (KR)

(72) Inventors: Seon Kyoon Mok, Hwaseong-si (KR); Seong Young Lee, Hwaseong-si (KR); Hyung Jun Park, Seongnam-si (KR); Dong Hyun Yoo, Hwaseong-si (KR); Kyung Hoe Lee, Seoul (KR); Hwan Young Jang, Daegu (KR); Chang Won Jeong, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 26 days.

(21) Appl. No.: 14/969,273

(22) Filed: Dec. 15, 2015

(65) Prior Publication Data

US 2016/0370669 A1 Dec. 22, 2016

(30) Foreign Application Priority Data

Jun. 22, 2015 (KR) ........................ 10-2015-0088260

(51) Int. Cl.
*G02F 1/136* (2006.01)
*G09G 3/36* (2006.01)

(52) U.S. Cl.
CPC ......... *G09G 3/3614* (2013.01); *G09G 3/3648* (2013.01); *G09G 2300/0426* (2013.01); *G09G 2300/0452* (2013.01); *G09G 2320/0233* (2013.01)

(58) Field of Classification Search
CPC ............... G09G 3/3614; G09G 3/3648; G09G 2300/0426; G09G 2300/0452; G09G 2320/0233
USPC ...................................................... 349/42–43
See application file for complete search history.

(56) References Cited

U.S. PATENT DOCUMENTS

| | | | | |
|---|---|---|---|---|
| 9,116,568 | B2 * | 8/2015 | Miyatake | G06F 3/0412 |
| 9,244,319 | B2 * | 1/2016 | Uehara | G02B 27/2214 |
| 9,293,101 | B2 * | 3/2016 | Kim | G09G 3/3614 |
| 2012/0075543 | A1 * | 3/2012 | Zeng | G02F 1/133514 349/42 |
| 2013/0194535 | A1 * | 8/2013 | Kim | G02F 1/13439 349/139 |

FOREIGN PATENT DOCUMENTS

| | | | |
|---|---|---|---|
| KR | 10-2008-0009897 | A | 1/2008 |
| KR | 10-2008-0093870 | A | 10/2008 |
| KR | 10-2011-0112649 | A | 10/2011 |
| KR | 10-2014-0103588 | A | 8/2014 |

* cited by examiner

*Primary Examiner* — Hoan C Nguyen
(74) *Attorney, Agent, or Firm* — Lee & Morse, P.C.

(57) ABSTRACT

A liquid crystal display includes a display panel, a data driver, and a scan driver. The display panel includes first and second pixel groups, each of having two pixels. The data driver is connected to the display panel via a plurality of data lines. The scan driver is connected to the display panel via a plurality of scan lines. The first pixel group is connected to one of the data lines. The second pixel group is connected to both the data line to which the first pixel group is connected and a data line adjacent to the data line to which the first pixel group is connected.

17 Claims, 9 Drawing Sheets

LIQUID CRYSTAL DISPLAY

CROSS-REFERENCE TO RELATED APPLICATION

Korean Patent Application No. 10-2015-0088260, filed on Jun. 22, 2015, and entitled, "Liquid Crystal Display," is incorporated by reference herein in its entirety.

BACKGROUND

1. Field

One or more embodiments described herein relate to a liquid crystal display.

2. Description of the Related Art

Liquid crystal display (LCDs) are widely used. The displays have a liquid crystal layer between a substrate having field-generating (e.g., pixel) electrodes and a substrate having a common electrode. An electric field is generated in the liquid crystal layer when voltages are applied to the field-generating electrodes. The electric field controls the orientation of liquid crystal molecules in the liquid crystal layer, and also the polarization of incident light, to generate images.

However, as the resolution of an LCD increases, the aperture ratio of the LCD panel decreases along with the luminance of the panels. In an attempt to address this problem, a PenTile arrangement of pixels has been suggested. In a PenTile pixel arrangement, pixels are arranged in 2×2 blocks pixels unlike in a red-green-blue pixel arrangement. As a result, vertical line defects and diagonal smudges may occur.

SUMMARY

In accordance with one or more embodiments, a liquid crystal display (LCD) includes a display panel including first and second pixel groups, each of the first and second pixel groups having two pixels; a data driver connected to the display panel via a plurality of data lines; and a scan driver connected to the display panel via a plurality of scan lines, wherein the first pixel group is connected to one of the data lines and the second pixel group is connected to both the data line to which the first pixel group is connected and a data line adjacent to the data line to which the first pixel group is connected.

The first pixel group may include k-th and (k+1)-th pixels, the second pixel group may include (k+2)-th and (k+3)-th pixels, and the k-th through (k+3)-th pixels may be connected to i-th through (i+3)-th scan lines, respectively. The (k+2)-th pixel may be connected to the data line adjacent to the data line to which the first pixel group is connected.

The data lines may include j-th and (j+1)-th data lines, and the k-th, (k+1)-th, and (k+3)-th pixels may be connected to the j-th data line and the (k+2)-th pixel is connected to the (j+1)-th data line. The data lines may include a (j+2)-th data line, the display panel may include a third pixel group having (k+4)-th and (k+5)-th pixels and a fourth pixel group having (k+6)-th and (k+7)-th pixels, the (k+4)-th through (k+7)-th pixels may be connected to the i-th through (i+3)-th scan lines, respectively, the (k+4)-th, (k+5)-th, and (k+7)-th pixels may be connected to the (j+1)-th data line, and the (k+6)-th pixel may be connected to the (j+2)-th data line. The k-th, (k+1)-th, (k+4)-th, and (k+5)-th pixels may be to emit light of different colors.

The k-th, (k+1)-th, (k+4)-th, and (k+5)-th pixels may emit light of different colors selected from the group consisting of red, green, blue, and white. The polarity of a data signal to be provided to one of the j-th through (j+2)-th data lines may be different from the polarity of data signals to be provided to the other two data lines.

The display panel may include third and fourth pixel groups, each of the third and fourth pixel groups having two pixels, the third pixel group may be connected only to the data line adjacent to the data line to which the first pixel group is connected, and the fourth pixel group may be connected to both the data line to which the first pixel group is connected and the data line adjacent to the data line to which the first pixel group is connected. The pixels in each of the first through fourth pixel groups may be connected to different scan lines. One of the pixels of the second pixel group may receive a scan signal first and one of the pixels of the fourth pixel group may receive a scan signal later are connected to a same data line.

In accordance with one or more other embodiments, a liquid crystal display (LCD) includes a display panel including k-th through (k+3)-th pixels; a data driver connected to the k-th through (k+3)-th pixels via a j-th data line; and a scan driver to sequentially apply a scan signal to the k-th through (k+3)-th pixels, wherein the k-th and (k+1)-th pixels are in the same direction relative to the j-th data line and wherein the (k+2)-th and (k+3)-th pixels are in opposite directions relative to the j-th data line.

The k-th and (k+1)-th pixels maybe on one side of the j-th data line and the (k+2)-th pixel may be on another side of the j-th data line. The display panel may include (k+4)-th through (k+7)-th pixel connected to the j-th data line, the (k+4)-th and (k+5)-th pixels may be in the same direction relative to the j-th data line, and the (k+6)-th and (k+7)-th pixels may be in opposite directions relative to the j-th data line.

The (k+4)-th, (k+5)-th and (k+7)-th pixels may be in an opposite direction to the k-th and (k+1)-th pixels relative to the j-th data line, and the (k+6)-th pixel may be in a same direction as the k-th and (k+1)-th pixels relative to the j-th direction. The display panel may include (k+8)-th through (k+11)-th pixels connected to the data driver via a (j+1)-th data line, the (k+8)-th and (k+9)-th pixels may be in a same direction relative to the (j+1)-th data line, and the (k+10)-th and (k+11)-th pixels may be in opposite directions relative to the (j+1)-th data line.

The display panel may include a first pixel group having first, second, eighth and ninth pixels and a second pixel group having third, fourth, tenth and eleventh pixels, the pixels of the first pixel group may emit light of different colors, and the pixels of the second pixel group may emit light of different colors.

The pixels of the first pixel group may emit light of different colors selected from the group consisting of red, green, blue and white, and the pixels of the second pixel group may emit light of different colors selected from the group consisting of red, green, blue and white. The display panel may include a plurality of pixels connected to the data driver via (j+2)-th and (j+3)-th data lines, the data driver may apply data signals with a same polarity to each of the j-th and (j+1)-th data lines, and may apply data signals with different polarities to the (j+2)-th and (j+3)-th data lines.

The display panel may include a plurality of pixels connected to the data driver via (j+2)-th through (j+7)-th data lines, and the data driver may apply data signals having a polarity inversion cycle of one of "+ + − + − − + −" or ""− − + − + + − +" relative to the j-th through (j+7)-th data lines.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
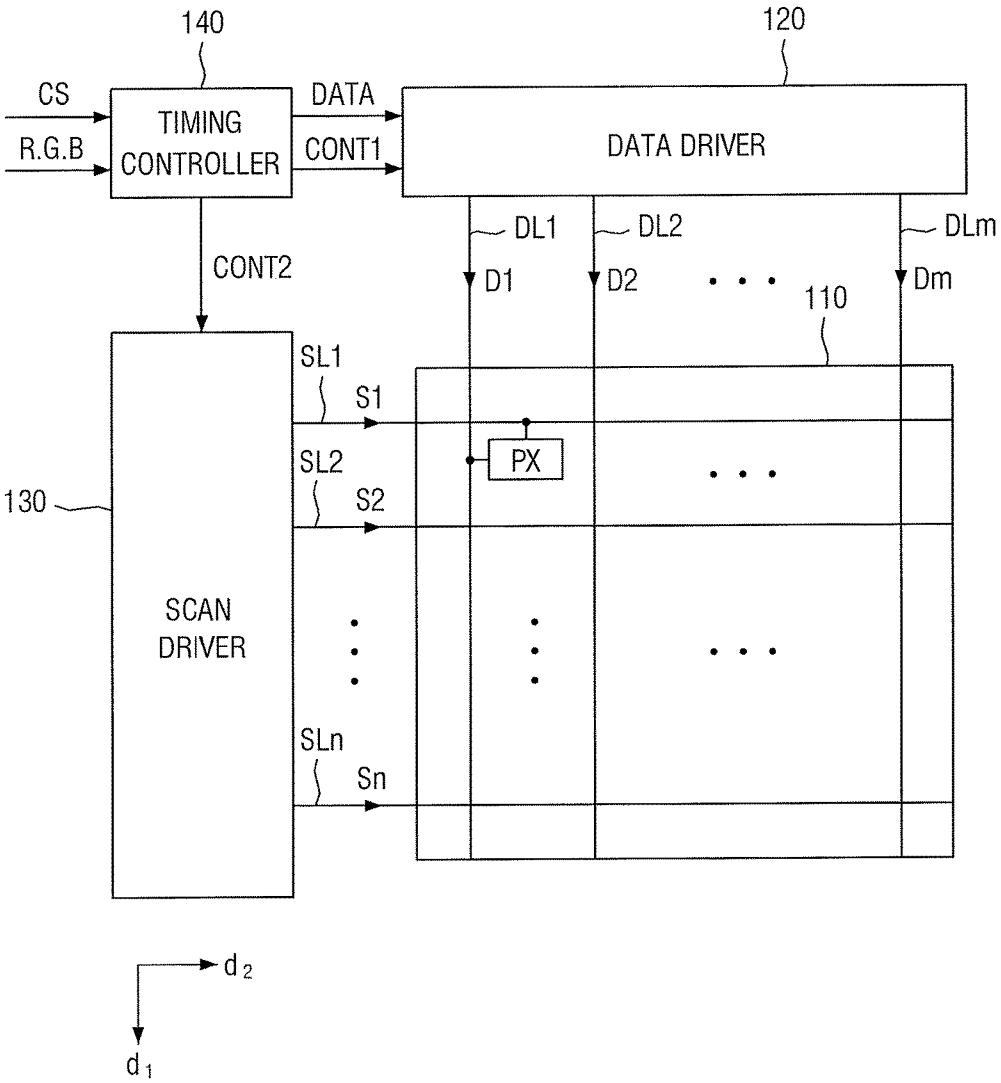
FIG. 1 illustrates an embodiment of a liquid crystal display.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present between the element and the another element. In contrast, when an element is referred to as being "directly on", "directly connected to" or "directly coupled to" another element or layer, there are no intervening elements or layers present between the element and the another element. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

FIG. 1 illustrates an embodiment of a liquid crystal display (LCD) which includes a display panel 110, a data driver 120, a scan driver 130 and a timing controller 140. The display panel 110 includes a liquid crystal layer between a lower display panel and an upper display panel for displaying images. The display panel 110 is connected to a plurality of scan lines SL1 through SLn and a plurality of data lines DL1 through DLm connected to a plurality of pixels (or pixel units) PX. The scan lines SL1 through SLn, the data lines DL1 through DLm. The pixel units PX may be formed on the lower display panel, and the scan lines SL1 through SLn and the data lines DL1 through DLm may be arranged to be insulated from each other.

The pixel units PX may be arranged in a matrix. The data lines DL1 through DLm may extend on the lower display panel along a first direction $d_1$. The scan lines SL1 through SLn may extend along a second direction $d_2$ which intersects the first direction $d_1$. The first direction $d_1$ may be a column direction and the second direction $d_2$ may be a row direction. Each pixel unit PX may be provided with a data signal by one of the data lines DL1 through DLm in response to a scan signal provided via one of the scan lines SL1 through SLn. Each pixel unit PX may be connected to a plurality of lines (e.g., sustain voltage lines) that provide a voltage (e.g., sustain voltage) applied in common to the pixel units PX.

The data driver 120 includes, for example, a shift register, a latch and a digital-to-analog converter (DAC). The data driver 120 may be provided with a first control signal CONT1 and image data DATA by the timing controller 140. The data driver 120 may select a reference voltage according to the first control signal CONT1, and may convert the image data DATA, which has a digital waveform, to a plurality of data voltages D1 through Dm according to the selected reference voltage. The data driver 120 may provide the data voltages D1 through Dm to the display panel 110.

The scan driver 130 may be provided with a second control signal CONT2 by the timing controller 140. The scan driver 130 may provide a plurality of scan signals Sl through Sn according to the second control signal CONT2.

The timing controller 140 may receive an image signal R.G.B and a control signal CS for controlling the image signal R.G.B from an external source. The control signal CS includes, for example, a vertical synchronization signal Vsync, a horizontal synchronization signal Hsync, a main clock signal MCLK, and a data enable signal DE. The timing controller 140 processes the signals from the external source, suitable to the operating conditions of the display panel 110, to generate the image data DATA, the first control signal CONT1, and a second control signal CONT2.

The first control signal CONT1 include a horizontal synchronization start signal STH and a load signal TP. The horizontal synchronization start signal STH indicates the start of the input of the image data DATA. The load signal TP controls application of the data voltages DLl through DLm to the data lines DLl through DLm. The second control signal CONT2 includes a scan initiation start signal STV for instructing the start of the output of the scan signals Sl through Sn and a gate clock signal CPV for controlling when to output a scan-on pulse.

The LCD may also include a power supply to provide an operating power for the LCD according to the present exemplary embodiment. The power supply may also provide a common voltage Vcom to the display panel 110 via a common line. The common line may apply the common voltage Vcom from the power supply to a common electrode of the display panel 110. The common line may be arranged, for example, on one side of the display panel 110 in one direction. The common line may be formed on the lower display panel or the upper display panel and may be insulated from the scan lines SLl through SLn. The common electrode may be integrally formed on the lower display panel or the upper display panel. The common voltage may be indicated by "Vcom".

Figure 2:
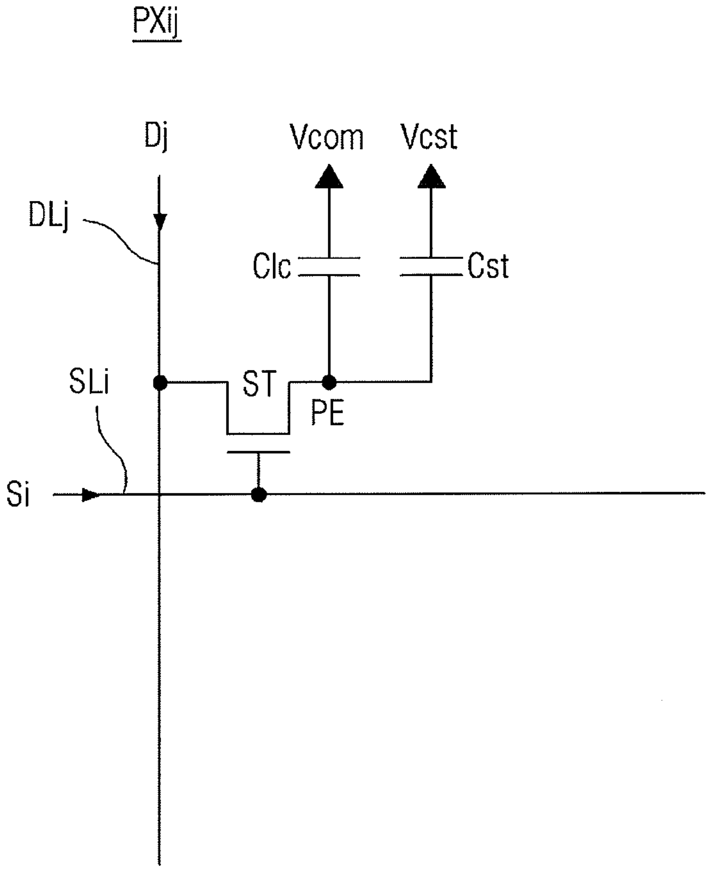
FIG. 2 illustrates an embodiment of a pixel unit.

FIG. 2 illustrates an embodiment of an equivalent circuit diagram of a pixel unit PXij in FIG. 1 connected to a j-th data line DLj and an i-th scan line SLi. Referring to FIG. 2, the pixel unit PXij includes a switching device ST, a liquid crystal capacitor Clc, and a storage capacitor Cst. The switching device ST is connected to the i-th scan line SLi, and has a first electrode connected to the j-th data line DLj and a second electrode connected to the liquid crystal capacitor Clc.

The switching device ST may be a P- or N-type transistor. The first electrode of the switching device ST may be, for example, a drain electrode. The second electrode of the switching device ST may be, for example, a source electrode. The switching device ST may be turned on in response to an i-th scan signal Si provided via the i-th scan line SLi. The switching device ST provides a j-th data signal Dj from the j-th data line DLj to a first electrode of the liquid crystal capacitor Clc, e.g., a pixel electrode PE.

The liquid crystal capacitor Clc includes the pixel electrode PE, which is connected to the second electrode of the switching device ST, and a common electrode Vcom which faces the pixel electrode PE. When the data signal is applied to the pixel electrode PE of the liquid crystal capacitor Clc and a common voltage Vcom is applied to the common electrode Vcom, the alignment of liquid crystal molecules in the liquid crystal layer may be changed by an electric field generated in the liquid crystal layer. The adjustment in liquid crystal molecules adjusts the amount of light transmitted through the liquid crystal layer or blocks the transmission of light.

The pixel unit PXij includes a storage capacitor Cst having a first terminal connected to the second electrode of the switching device ST and a second terminal to which a sustain voltage Vcst is applied via a sustain electrode. The sustain voltage Vcst may have the same level as the common voltage Vcom. The storage capacitor Cst, ay sustain a current data signal that the liquid crystal capacitor Clc is charged with until the liquid crystal capacitor Clc is charged with a subsequent data signal.

Figure 3:
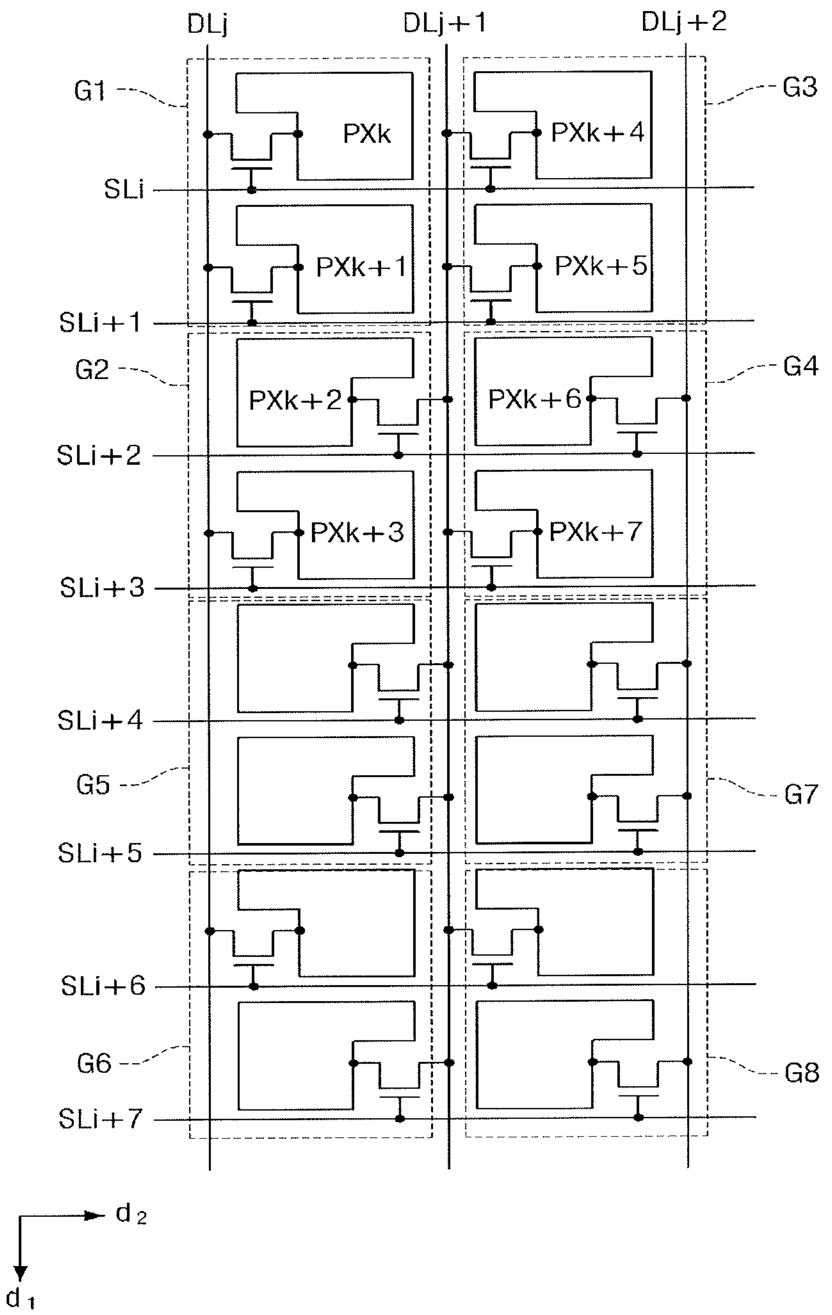
FIG. 3 illustrates an embodiment of an arrangement of pixels.

FIG. 3 illustrates an embodiment of am arrangement of pixel units. Referring to FIG. 3, the display panel 110 in FIG. 1 may include a first pixel group G1 having k-th and (k+1)-th pixel units PXk and PXk+1 and a second pixel group G2 having (k+2)-th and (k+3)-th pixel units PXk+2 and PXk+3. The k-th through (k+3)-th pixel units PXk through PXk+1 may be connected to different scan lines. For example, the k-th through (k+3)-th pixel units PXk through PXk+1 may be connected to i-th through (i+3)-th scan lines SLl through SLi+3, respectively. Accordingly, the k-th through (k+3)-th pixel units PXk through PXk+1 may be sequentially provided with a scan signal by the scan driver 130 of FIG. 1.

The k-th and (k+1)-th pixel units PXk and PXk+1 in the first pixel group G1 may be connected to the same data line. For example, the k-th and (k+1)-th pixel units PXk and PXk+1 may be connected to the j-th data line DLj. On the other hand, the (k+2)-th and (k+3)-th pixel units PXk+2 and PXk+3 in the second pixel group G2 may be connected to different scan lines. For example, in response to the (k+2)-th pixel unit PXk+2 being connected to a predetermined data line, the (k+3)-th pixel unit PXk+3 may be connected to a data line adjacent to the predetermined data line. The (k+2)-th pixel unit PXk+2 may be connected to a data line adjacent to the data line to which the k-th and (k+1)-th pixel units PXk and PXk+1 are both connected. For example, in response to the k-th and (k+1)-th pixel units PXk and PXk+1 both being connected to the j-th data line DLj, the (k+2)-th pixel unit PXk+2 may be connected to a (j+1)-th data line adjacent to the j-th data line DLj.

The display panel 110 may also include a third pixel group G3 having (k+4)-th and (k+5)-th pixel units PXk+4 and PXk+5 and a fourth pixel group G4 having (k+6)-th and (k+7)-th pixel units PXk+6 and PXk+7. The (k+4)-th through (k+7)-th pixel units PXk+4 through PXk+7 may be connected to different scan lines. For example, the (k+4)-th through (k+7)-th pixel units PXk+4 through PXk+7 may be connected to the i-th through (i+3)-th scan lines SLl through SLi+3, respectively. For example, the k-th and (k+4)-th pixel units PXk and PXk+4 may be connected to the same scan line, the (k+1)-th and (k+5)-th pixel units PXk and PXk+4 may be connected to the same scan line, the (k+2)-th and (k+6)-th pixel units PXk and PXk+4 may be connected to the same scan line, and the (k+3)-th and (k+7)-th pixel units PXk and PXk+4 may be connected to the same scan line.

The (k+4)-th and (k+5)-th pixel units PXk+4 and PXk+5 in the third pixel group G3 may be connected to the same data line. On the other hand, the (k+6)-th and (k+7)-th pixel units PXk+6 and PXk+7 in the fourth pixel group G4 may be connected to different data lines. For example, the (k+4)-th and (k+5)-th pixel units PXk+4 and PXk+5 may be connected to the (j+1)-th data line DLj+1, and the (k+6)-th and (k+7)-th pixel units PXk+6 and PXk+7 may be connected to a (j+2)-th data line DLj+2. For example, the pixel units in the first pixel group G1 may be connected to a different data line from, but may have the same pattern arrangement as, the pixel units in the third pixel group G3. Similarly, the pixel units in the second pixel group G2 may be connected to a different data line from, but may have the same pattern arrangement as, the pixel units in the fourth pixel group G4.

The pixel units in the first pixel group G1 and the pixel units in the third pixel group G3 may render different colors from one another. For example, the k-th, (k+1)-th, (k+4)-th, and (k+5)-th pixel units PXk, PXk+1, PXk+4, and PXk+5 may emit light of different colors selected, for example, from among red, green, blue and white from one another. Similarly, the pixel units in the second pixel group G2 and the pixel units in the fourth pixel group G4 may emit light of different colors from one another. For example, the (k+2)-th, (k+3)-th, (k+6)-th, and (k+7)-th pixel units PXk+2, PXk+3, PXk+6, and PXk+7 may emit light of different colors selected, for example, from among red, green, blue and white from one another.

The display panel 110 may include fifth and sixth pixel groups G5 and G6. As illustrated in FIG. 3, each of the fifth and sixth pixel groups G5 and G6 may include two pixel units. The pixel units in the fifth pixel group G5 and the pixel unit in the sixth pixel group G6 may be connected to different scan lines, for example, (i+4)-th through (i+7)-th scan lines SLi+4 through SLi+7.

The pixel units in the fifth pixel group G5 may be connected to the same data line, which is different from the data line to which the pixel units in the first pixel group G1. For example, in response to the pixel units in the first pixel group G1 being connected to the j-th data line DLj, the pixel units in the fifth pixel group G5 may be connected to the (j+1)-th data line DLj+1. Alternatively, in response to the pixel units in the first pixel group G1 being connected to the (j+1)-th data line DLj+1, the pixel units in the fifth pixel group G5 may be connected to the j-th data line DLj.

The pixel units in the sixth pixel group G6 may be disposed in different directions, for example, alternating with the pixel units in the second pixel group G2. For example, in response to one of the pixel units of the second pixel group G2 that receives a scan signal first being connected to the (j+1)-th data line DLj+1 and the other pixel unit of the second pixel group G2 being connected to the j-th data line DLj, one of the pixel units of the sixth pixel group G6 that receives a scan signal first may be connected to the j-th data line DLj. The other pixel unit of the sixth pixel group G6 may be connected to the (j+1)-th data line DLj+1.

Alternatively, in response to one of the pixel units of the second pixel group G2 that receives a scan signal first being connected to the j-th data line DLj and the other pixel unit of the second pixel group G2 being connected to the (j+1)-th data line DLj+1, one of the pixel units of the sixth pixel group G6 that receives a scan signal first may be connected to the (j+1)-th data line DLj+1. The other pixel unit of the sixth pixel group G6 may be connected to the j-th data line DLj.

Thus, the LCD according to the present exemplary embodiment may include a display panel 110 in which a plurality of pixel units are arranged in units of pixel groups each having two pixel units, as illustrated in FIG. 3. More specifically, in response to two pixel units in the first pixel group G1 being connected to the j-th data line DLj, two pixel units in the second pixel group G2 may be respectively connected to the (j+1)-th and j-th data data lines DLj+1 and DLj. Also, in response to two pixel units in the third pixel group G3 being connected to the (j+1)-th data line DLj+1, two pixel units in the fourth pixel group G4 may be respectively connected to the j-th and (j+1)-th data lines DLj and DLj+1. Thus, the LCD according to the present exemplary embodiment may include a display panel 110 having a 2-dot staggered arrangement and may thus address vertical line defects and diagonal smudges.

Figure 4:
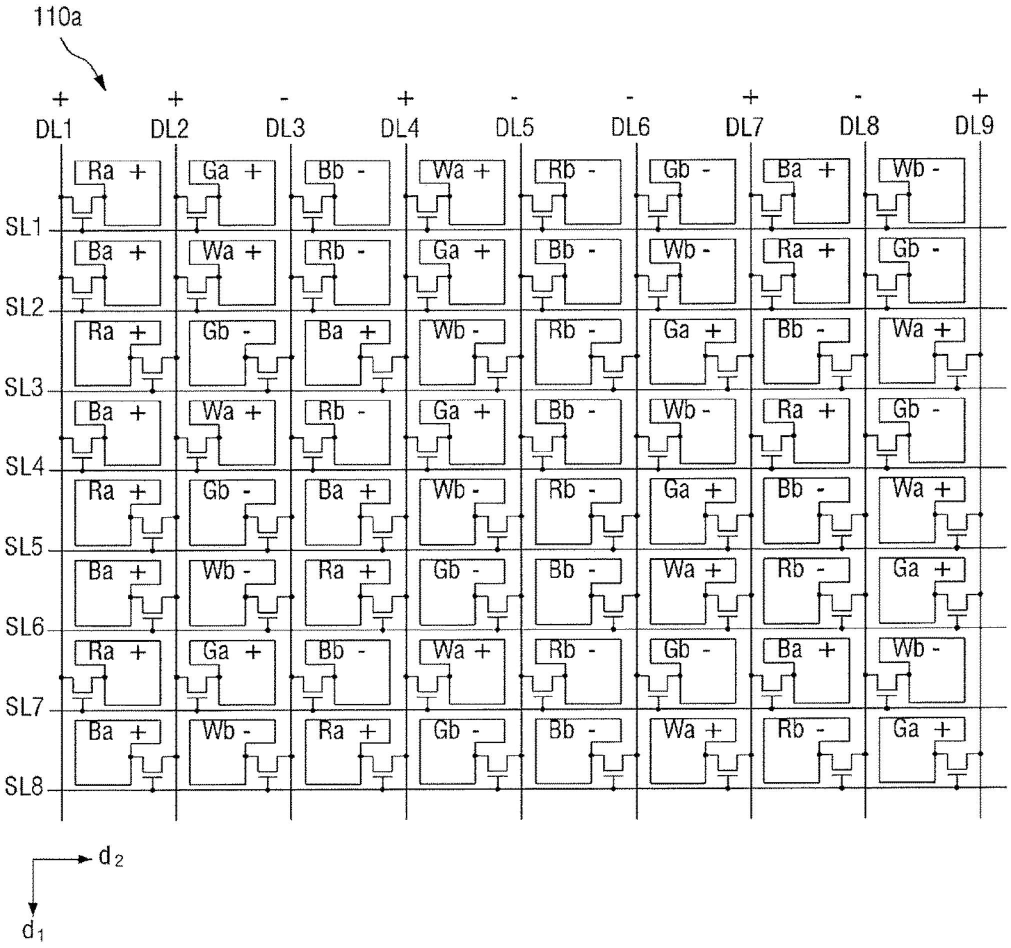
FIG. 4 illustrates an embodiment of a display panel.
Figure 5:
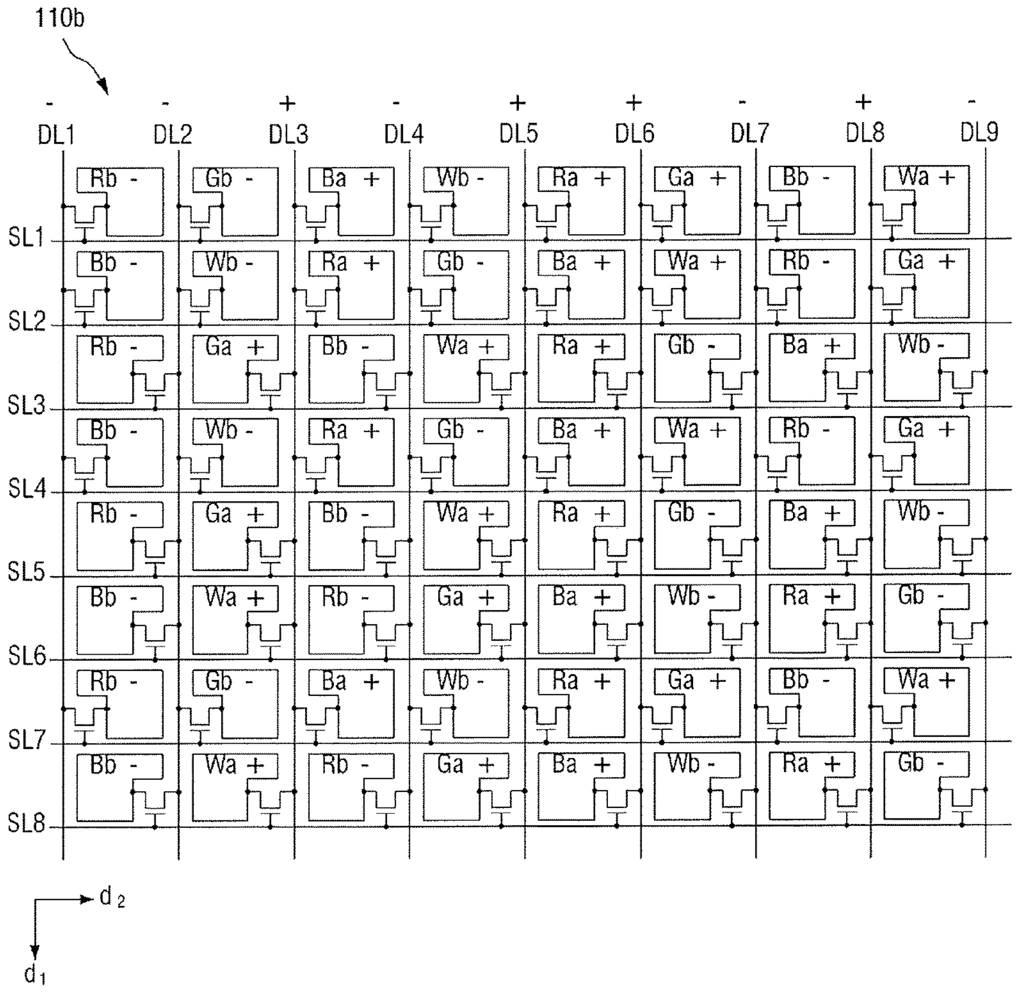
FIG. 5 illustrates another embodiment of a display panel.

FIGS. 4 and 5 illustrate different embodiments of a display panel which includes the pixel unit arrangement in FIG. 3. In these embodiments, it is assumed for illustrative purposes only that eight pixel units are arranged along each of the first and second directions $d_1$ and $d_2$.

In FIGS. 4 and 5, pixel units that emit light of a red color, green color, blue color, and white color are indicated by reference characters R, G, B and W, respectively. Also, a data signal having a higher voltage than the common voltage Vcom may be defined as having a positive polarity (+). A data signal having a lower voltage than the common voltage Vcom may be defined as having a negative polarity (−). Additionally, pixel units driven with the positive polarity (+) in an arbitrary frame may be referred to by reference character Ra, Ga, Ba or Wa depending on the color of light to be emitted by the pixel units. Pixel units driven with the negative polarity (−) in an arbitrary frame may be referred to by reference character Rb, Gb, Bb or Wb depending on the color of light to be emitted by the pixel units.

Referring to FIG. 4, the data driver 120 of FIG. 1 may sequentially provide data signals of the following arrangement to the first through eighth data lines DL1 through DL8 of a display panel 110*a*: positive polarity (+), positive polarity (+), negative polarity (−), positive polarity (+), negative polarity (−), negative polarity (−), positive polarity (+), and negative polarity (−), respectively, by the data driver 120 of FIG. 1. A positive polarity (+) signal is applied to data line DL9.

Accordingly, pixel units Ra and Ba may be alternately arranged between the first and second data lines DL1 and DL2 along the first direction $d_1$. Also, pixel units Ga, Wa, Gb, Wa, Gb, Wb, Ga, and Wb may be alternately arranged between the second and third data lines DL2 and DL3 along the first direction $d_1$. Also, pixel units Bb, Rb, Ba, Rb, Ba, Ra, Bb, and Ra may be alternately arranged between the third and fourth data lines DL3 and DL4 along the first direction $d_1$. Also, pixel units Wa, Ga, Wb, Ga, Wb, Gb, Wa, and Gb may be alternately arranged between the fourth and fifth data lines DL4 and DL5 along the first direction $d_1$.

The fifth through eighth data lines DL5 through DL8 may receive data signals with inverted polarities from the first through fourth data lines DL1 through DL4. For example, in response to the polarity of the data signals applied to the first through fourth data lines DL1 through DL4 may be "+ + − +", the polarity of the data signals applied to the fifth through eighth data lines DL5 through DL8 may be "− + − +".

Accordingly, pixel units disposed among the fifth through eighth data lines DL5 through DL8 and a ninth data line DL9 may render the same colors as the pixel units disposed among the first through fourth data lines DL1 through DL4, but may be provided with data signals with opposite polarities to those of the data signals applied to the pixel units disposed among the first through fourth data lines DL1 through DL4.

Referring to FIG. 5, the data driver 120 may sequentially provide data signals in the following arrangement to the first through eighth data lines DL1 through DL8 of a display panel 110*b* in FIG. 1: the negative polarity (−), the negative polarity (−), the positive polarity (+), the negative polarity (−), the positive polarity (+), the positive polarity (+), the negative polarity (−), and the positive polarity (+), respectively. A negative polarity (−) signal is applied to data line DL9. Thus, the polarities of the data signals applied to the display panel 110*b* via the first through eighth data lines DL1 through DL8 may be opposite to the polarities of the data signals applied to the display panel 110*a* via the first through eighth data lines DL1 through DL8.

Accordingly, the display panel 110*b* may emit light of the same colors as the display panel 110*a*, but may be provided with data signals with opposite polarities to the data signals applied to the display panel 110*a*.

Thus, the LCD according to the present exemplary embodiment may use the pixel unit arrangement of FIG. 4 or 5 and may control the polarity inversion cycle of each data signal to be "+ + − + − − + −" (as illustrated in FIG. 4) or "− − + − + + − +" (as illustrated in FIG. 5). In response to each data signal being applied with the polarity inversion cycle of FIG. 4 or 5, the positive polarity (+) and the negative polarity (−) may offset each other, on average, throughout the pixel units of the display panel 110. As a result, no dominant polarity appears along each horizontal line. Accordingly, a phenomenon in which the common voltage Vcom is shifted due to a dominant polarity may be reduced or may not occur.

In an LCD having the display panel 110*a* of FIG. 4 or the display panel 110*b* of FIG. 5, the number of pixel units emitting light of a predetermined color and receiving a data signal with a positive polarity (+) may be the same as the number of pixel units emitting light of the predetermined color and receiving a data signal with a negative polarity (−). Accordingly, crosstalk may be reduced or eliminated. In addition, the LCD according to the present exemplary embodiment may display gray voltages with various polarities during a single frame. As a result, flicker may be reduced or eliminated.

Figure 6:
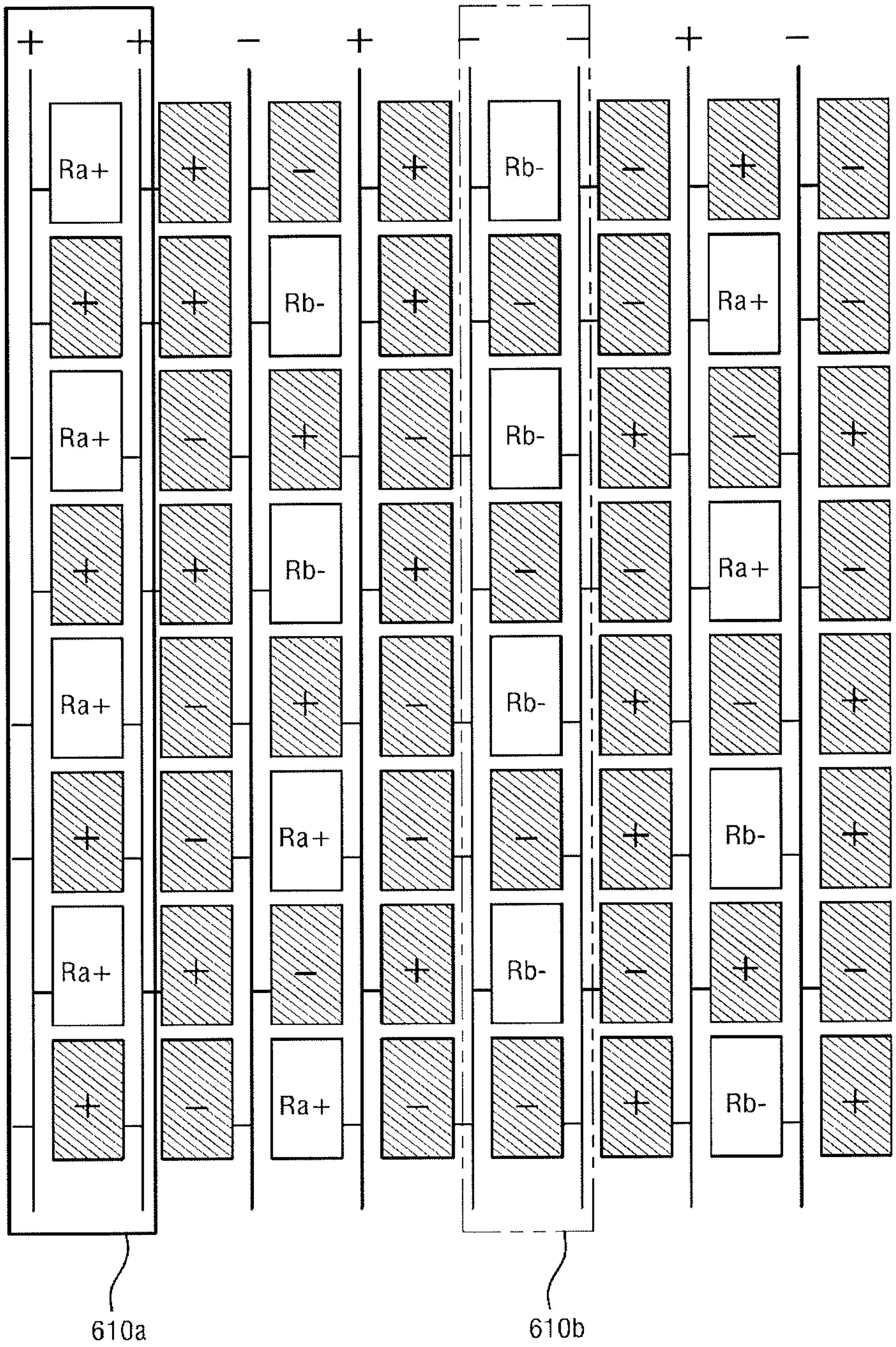
FIGS. 6-9 illustrate examples of benefits of the aforementioned embodiments.
Figure 7:
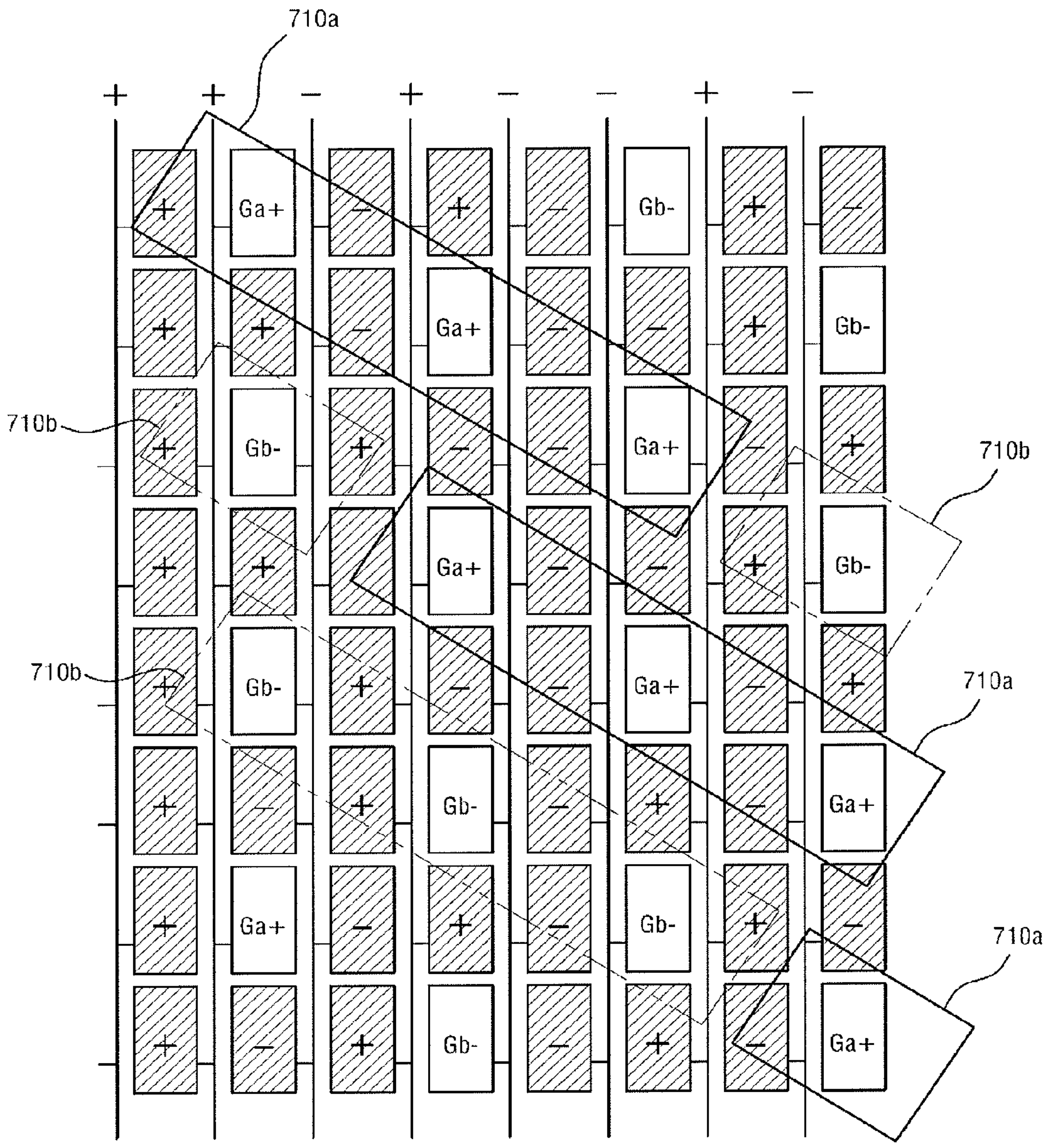
Figure 8:
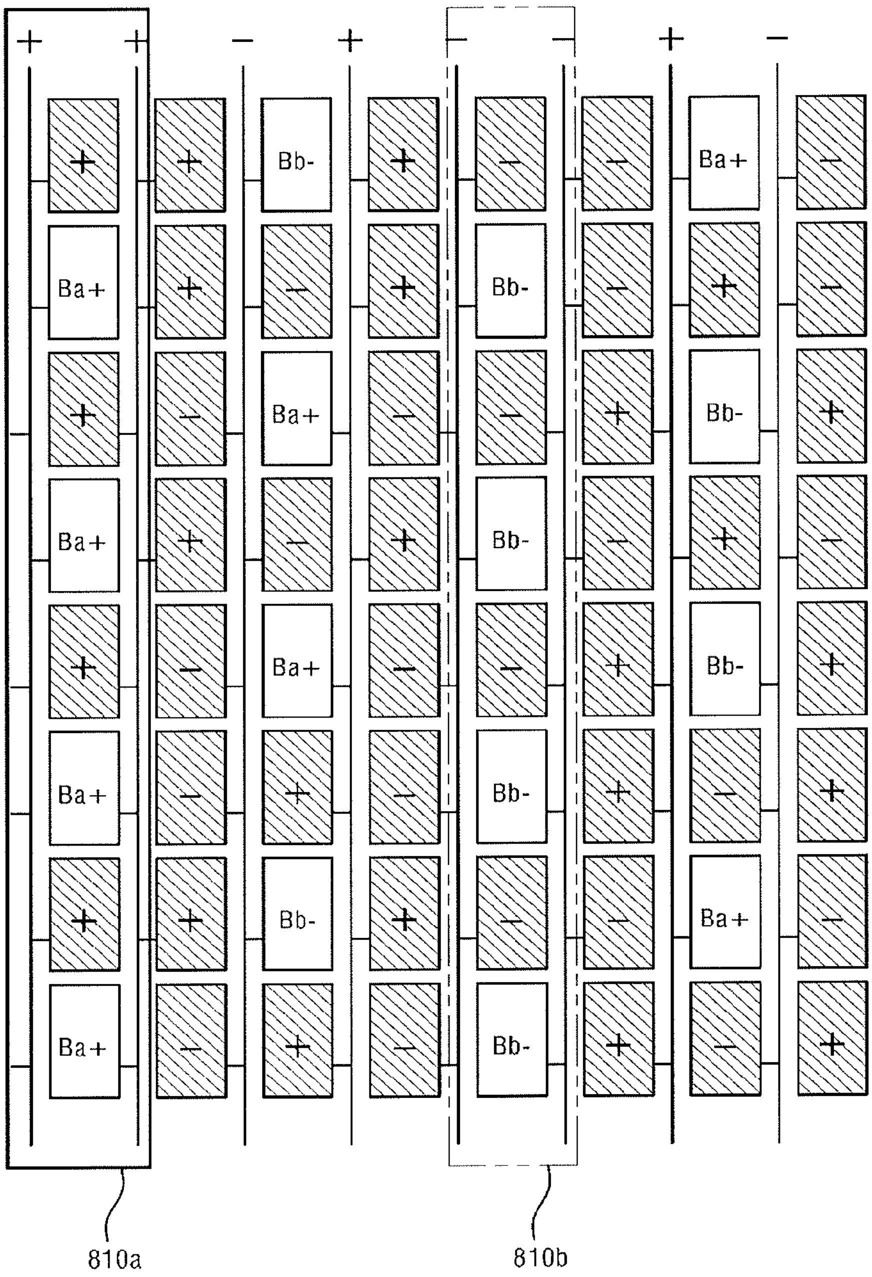
Figure 9:
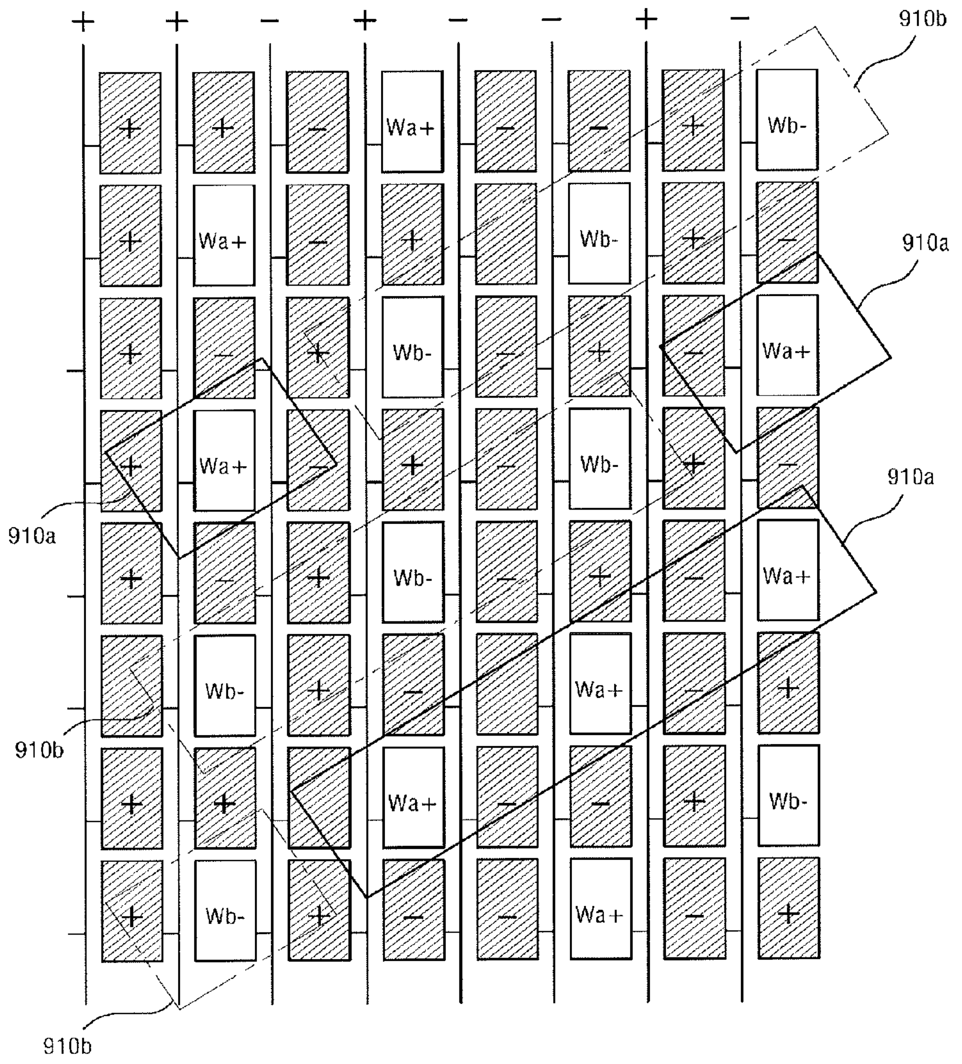

FIGS. 6 to 9 illustrate examples of benefits of the LCD according to the aforementioned embodiments. In FIG. 6, all pixel units except for pixel units emitting red color light are shaded. In FIG. 7, all pixel units except for pixel units emitting green color light are shaded. In FIG. 8, all pixel units except for pixel units emitting blue color light are shaded. In FIG. 9, all pixel units except for pixel units emitting white color light are shaded. In FIGS. 6 through 9, the polarity of data signals applied to the display panel 110 may be "+ + − + − − + −".

In the examples of FIGS. 6 and 8, the positive polarity (+) and the negative polarity (−) may be evenly distributed throughout the display panel 110. Also, in the examples of FIGS. 6 and 8, since pixel units emitting the same color light are arranged in a staggered pattern throughout the display panel 110, visibility in the vertical direction may be improved.

Also, referring to FIG. 7, pixel units in an area 710*a* emit green color light with the positive polarity (+), but pixel units in an area 710*b* emit green color light with the negative polarity (−). Referring to FIG. 9, pixel units in an area 910*a* emit white color light with the positive polarity (+), but pixel units in an area 910*b* emit white color light with the negative polarity (−).

Also, in the examples of FIGS. 7 and 9, pixel units with the positive polarity (+) and pixel units with the negative polarity (−) may both be arranged along a diagonal direction, instead of arranging pixel units with the same polarity along the diagonal direction. Accordingly, diagonal smudges may be prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A liquid crystal display (LCD), comprising:

a display panel including first and second pixel groups, each of the first and second pixel groups having two pixels, wherein:

the two pixels of the first pixel group and the two pixels of the second pixel group are sequentially and adjacently arranged in a first direction, and three pixels among the two pixels of the first pixel group and the two pixels of the second pixel group are connected to a first data line, and a remaining pixel among the two pixels of the first pixel group and the two pixels of the second pixel group is connected to a second data line, wherein:

the first pixel group includes k-th and (k+1)-th pixels, the second pixel group includes (k+2)-th and (k+3)-th pixels, the k-th through (k+3)-th pixels are connected to i-th through (i+3)-th scan lines, respectively, and the (k+2)-th pixel is connected to the second data line adjacent to the first data line.

2. The LCD as claimed in claim 1, wherein:

the display panel includes third and fourth pixel groups, each of the third and fourth pixel groups having two pixels, the two pixels of the third pixel group and the two pixels of the fourth pixel group are sequentially and adjacently arranged in the first direction, three pixels among the two pixels of the third pixel group and the two pixels of the fourth pixel group are connected to the second data line, and a remaining pixel among the two pixels of the third pixel group and the two pixels of the fourth pixel group is connected to a third data line.

3. The LCD as claimed in claim 2, wherein the pixels in each of the first through fourth pixel groups are connected to different scan lines.

4. The LCD as claimed in claim 2, wherein one of the two pixels of the second pixel group and one of the two pixels of the fourth pixel group are connected to a same data line.

5. A liquid crystal display (LCD), comprising:

a display panel including first and second pixel groups, each of the first and second pixel groups having two pixels;

a data driver to supply data signals to the display panel via a plurality of data lines; and a scan driver connected to the display panel via a plurality of scan lines, wherein:

the two pixels of the first pixel group and the two pixels of the second pixel group are sequentially and adjacently arranged in a first direction, three pixels among the two pixels of the first pixel group and the two pixels of the second pixel group are connected to a first data line, and a remaining pixel among the two pixels of the first pixel group and the two pixels of the second pixel group is connected to a second data line, and wherein:

the first pixel group includes k-th and (k+1)-th pixels, the second pixel group includes (k+2)-th and (k+3)-th pixels, the k-th through (k+3)-th pixels are connected to i-th through (i+3)-th scan lines, respectively, the first data line includes a j-th data line, the second data line includes a (j+1) data line, and the k-th, (k+1)-th, and (k+3)-th pixels are connected to the j-th data line and the (k+2)-th pixel is connected to the (j+1)-th data line.

6. The LCD as claimed in claim 5, wherein:

the display panel includes a third pixel group having (k+4)-th and (k+5)-th pixels and a fourth pixel group having (k+6)-th and (k+7)-th pixels, the (k+4)-th through (k+7)-th pixels are connected to the i-th through (i+3)-th scan lines, respectively, the (k+4)-th, (k+5)-th, and (k+7)-th pixels are connected to the (j+1)-th data line, and the (k+6)-th pixel is connected to a (j+2)-th data line.

7. The LCD as claimed in claim 6, wherein the k-th, (k+1)-th, (k+4)-th, and (k+5)-th pixels are to emit light of different colors.

8. The LCD as claimed in claim 6, wherein the k-th, (k+1)-th, (k+4)-th, and (k+5)-th pixels are to emit light of different colors selected from the group consisting of red, green, blue, and white.

9. The LCD as claimed in claim 6, wherein a polarity of a data signal to be provided to one of the j-th through (j+2)-th data lines is different from polarities of data signals to be provided to remaining two data lines of the j-th through (j+2)-th data lines.

three pixels among the two pixels of the third pixel group and the two pixels of the fourth pixel group are connected to the second data line, and a remaining pixel among the two pixels of the third pixel group and the two pixels of the fourth pixel group is connected to a third data line.

10. A liquid crystal display (LCD), comprising:

a display panel including k-th through (k+3)-th pixels being sequentially and adjacently arranged in a first direction;

a data driver to supply data signals to the k-th through (k+3)-th pixels via a plurality of data lines; and a scan driver to sequentially apply a scan signal to the k-th through (k+3)-th pixels, wherein:

three pixels among the k-th through (k+3)-th pixels are connected to a j-th data line, and a remaining pixel among the k-th through (k+3)-th pixels is connected to a (j+1)-th data line, wherein the k-th, (k+1)-th, and (k+3)-th pixels are connected to the j-th data line and the (k+2)-th pixel is connected to the (j+1)-th data line adjacent to the j-th data line.

11. The LCD as claimed in claim 10, wherein:

the display panel includes (k+4)-th through (k+7)-th pixels, three pixels among the (k+4)-th through (k+7)-th pixels are connected to the (j+1)-th data line, and a remaining pixel among the (k+4)-th through (k+7)-th pixels is connected to a (j+2)-th data line.

12. The LCD as claimed in claim 11, wherein:

the (k+4)-th, (k+5)-th and (k+7)-th pixels are connected to the (j+1)-th data line, and the (k+6)-th pixel is connected to the (j+2)-th data line.

13. The LCD as claimed in claim 10, wherein:

the display panel includes (k+8)-th through (k+11)-th pixels, three pixels among the (k+8)-th through (k+11)-th pixels are connected to the (j+1)-th data line, and a remaining pixel among the (k+8)-th through (k+11)-th pixels is connected to the j-th data line.

14. The LCD as claimed in claim 13, wherein:

the display panel includes a first pixel group having the k-th, (k+1)-th, (k+4)-th, and (k+5)-th pixels and a second pixel group having the (K+2)-th, (k+3)-th, (k+6)-th, and (k+7)-th pixels, the k-th, (k+1)-th, (k+4)-th, and (k+5)-th pixels of the first pixel group are to emit light of different colors, and the (K+2)-th, (k+3)-th, (k+6)-th, and (k+7)-th pixels of the second pixel group are to emit light of different colors.

15. The LCD as claimed in claim 14, wherein:

the k-th, (k+1)-th, (k+4)-th, and (k+5)-th pixels of the first pixel group are to emit light of different colors selected from the group consisting of red, green, blue and white, and the (K+2)-th, (k+3)-th, (k+6)-th, and (k+7)-th pixels of the second pixel group are to emit light of different colors selected from the group consisting of red, green, blue and white.

16. The LCD as claimed in claim 13, wherein:

the display panel includes a plurality of pixels connected to the data driver via a (j+3)-th data line, and the data driver is to apply the data signals with a same polarity to each of the j-th and (j+1)-th data lines and is to apply the data signals with different polarities to the (j+2)-th and (j+3)-th data lines.

17. The LCD as claimed in claim 13, wherein:

the display panel includes a plurality of pixels connected to the data driver via (j+3)-th through (j+7)-th data lines, and the data driver is to apply the data signals having a polarity inversion cycle of one of "+ + − + − − + − "or "'− − + − + + − + "relative to the j-th through (j+7)-th data lines.

* * * * *